United States Patent [19]
Fillmore

[11] Patent Number: 6,098,611
[45] Date of Patent: Aug. 8, 2000

[54] PORTABLE COOKER

[76] Inventor: David Fillmore, P.O. Box 68, La Grange, Tex. 78945

[21] Appl. No.: 09/421,042

[22] Filed: Oct. 20, 1999

[51] Int. Cl.[7] ................................................. F24C 15/08
[52] U.S. Cl. ............................ 126/50; 126/9 R; 126/30; 126/40
[58] Field of Search ................... 126/9 R, 9 B, 126/25 R, 41 R, 38, 40, 50, 24, 30, 29

[56] References Cited

U.S. PATENT DOCUMENTS

| | | | |
|---|---|---|---|
| 3,176,676 | 4/1965 | Caldwell | 126/9 R |
| 4,353,347 | 10/1982 | Seed | 126/41 R |
| 4,530,345 | 7/1985 | Christiansen | 126/40 |
| 4,809,671 | 3/1989 | Vallejo, Jr. | 126/40 |
| 5,065,735 | 11/1991 | Bourgeois et al. | 126/40 |
| 5,158,067 | 10/1992 | Dutro et al. | 126/50 |
| 5,529,053 | 6/1996 | Carter | 126/9 R |

*Primary Examiner*—James C. Yeung
*Attorney, Agent, or Firm*—Penrose Lucas Albright

[57] ABSTRACT

A portable gaseous fuel heated cooker which connects via flexible hose to a pressurized gas source such as a propane bottle. The cooker as such comprises four parts, a round bottom wok-like disk, a burner unit, a tubular post and a coplanar base. The disk has a threaded stud depending therefrom which is threadably received in the top of the burner unit, the bottom of the burner unit is similarly connectable to the tubular post which, in turn, is similarly connectable to the base. The burner unit has radial flanges which extend a short distance above a cylindrical shield of the burner unit, the overall unit is about thirty-two inches in height but with the tubular post removed is about twelve inches in height. If the disk is removed flat bottom heating utensils can be placed directly on the burner unit and with both the burner unit and the tubular post removed the disk can be threadably received by the base to provide an assemblage which has several uses including transport of the unit parts with the burner and posts carried in the disk. An annular sleeve can be provided to encircle the tubular post and be slidably therealong which is connected to clamp a propane bottle in place spaced from and relative to the tubular post. Special handles for the disk may be provided to minimize heat transfer from the disk when cooking.

19 Claims, 6 Drawing Sheets

PORTABLE COOKER

FIELD OF THE INVENTION

The invention relates to a portable fluid fueled food cooker. More particularly, it relates to an outdoor barbecue of the type which can be easily assembled and disassembled and which includes a rounded bottom cooking vessel similar to a wok.

BACKGROUND OF THE INVENTION

Relatively lightweight transportable barbecues are well known. In general, they include a stand, often consisting of three legs which support a container for charcoal or having one or more burners which underlie a grill. Where burners are involved, the use of a pressurized gas supply such as a propane container is common. Some are supported at a comfortable cooking height whereas others are designed to be received on an open automobile tailgate or picnic table. U.S. Pat. No. 3,176,676 of Apr. 6, 1965 to Caldwell discloses a portable grill which may be assembled for cooking food at a convenient height while supported by the ground or may be alternatively assembled to stand on a table to permit cooking at a convenient height above the table. The same patent also discloses an arrangement wherein the grill and parts therefor may be disassembled and reassembled to provide a unitary package for carrying the grill in its disassembled condition. The portable grill of Caldwell is, however, intended for use with charcoal and does not include a burner which utilizes pressurized gas for fuel. In U.S. Pat. No. 4,353,347 to Seed which issued Oct. 12, 1982, a portable cooker that is connected to a pressurized gas supply is disclosed. This particular cooker is also adaptable for assembly and disassembly. A bowl shaped cooking pan having a pair of support handles which extend from the periphery of the pan is provided. As with the Caldwell portable grill, Seed provides a portable cooker which can be disassembled for storage or transport. Seed also discloses the use of the pressurized gas bottle to provide a stable platform, thus eliminating three or four legs used in prior art structures. A stove which is intended specifically for supporting round bottom vessels is disclosed in U.S. Pat. No. 4,530,345 of Christiansen dated Jul. 23, 1985. Christiansen points out that ordinary grills are unsatisfactory for supporting cooking vessels having spherical or rounded bottoms. Special structures are required not only to stabilize them but also to hold them securely during vigorous stirring of the contents. It is also considered important by Christiansen that the underlying structure not interfere with the heating of the entire bottom of vessels having rounded bottoms such as woks. The portable gas-fired cooking unit disclosed in U.S. Pat. No. 4,809,671 of Mar. 7, 1989 to Vallejo, Jr. discloses a cooking pan or enclosure which is heated by a conventional bottle container of compressed propane gas, the burner is disclosed as being under the cooking pan or enclosure. An auxiliary burner is provided which can be utilized without heating the main unit wherein it is stated that it would be ideal for the preparation of early morning camp coffee or as a side burner for sauces and the like. Vallejo, Jr. further describes a compact carrying case into which the cooking unit can be compactly stored when in a disassembled condition. U.S. Pat. No. 5,158,067 of Dutro et al discloses a portable fuel food cooker which is adapted to receive the rounded bottom of a wok. The cooker is said to be light and compact and, in the preferred form, may be easily disassembled into a component part to facilitate transportation and storage. However, as exemplified by the patent to Vallejo, Jr., mentioned above, despite the advantages of a rounded bottom cooking container such as the wok, a need exist for a portable cooker which is relatively light, can be easily assembled and disassembled and which can be utilized without difficulty for cooking drinks, such coffee as well as various types of foods in utensils which have flat bottoms rather than rounded ones.

SUMMARY OF THE INVENTION

An object of the present invention is to provide a portable cooker having the capacity to heat both rounded bottom wok-like utensils as well as flat bottom utensils, and which may be adaptable for other uses and at the same time, is relatively simple to manufacture and can be assembled and disassembled without difficulty for transport and storage purposes. The portable cooking device of the invention includes a cooking disk having a pair of handles rigidly connected thereto and extending outwardly relatively to the periphery of the disk, a threaded stud or bolt is rigidly centrally connected to the bottom of the disk and extends normally therefrom. This stud is received by the structure of a burner unit which heats the disk via an underlying internal burner. The burner, as such is conventional and the structure it underlies comprises three flanges which extend radially outwardly from a body comprising a vertical shaft disposed at the center of a burner unit to a cylindrical shield which surrounds the burner, shaft and flanges. The flanges also extend upwardly a short distance above the top of the cylindrical shield to form a flat surface which, in the absence of the disk, is capable of receiving skillets, pots, pans, and other flat-bottomed cooking utensils that it supports over the burner. The three flanges intersect in the center of the burner unit where they are welded or otherwise rigidly secured to the aforementioned vertical shaft. A threaded opening is provided in the center of the shaft which receives the stud depending from the cooking disk. The diameter of the burner shield is roughly forty percent of the diameter of the disk whereby the heated air and gases emitted from the burner unit impinge the disc centrally and flow upwardly and outwardly from the bottom of the disk. The disk is thus heated by the heated air and gases of combustion emitted from the burner unit not only centrally but also in the area between the burner shield and the periphery of the disk. The flanges provide guidance for the heated air and gases of combustion so that they flow from the burner unit radially outwardly relative to the disk. The burner unit is supported on the bottom side via a bracket to a tubular post. Extending downwardly from the bracket is a further threaded stud having the same thread pitch and diameter as the first mentioned thread stud. The further threaded stud is received in a threaded opening in the top of the tubular post. The tubular post has, in turn a still further threaded stud at its bottom which has the same thread pitch and diameter as the other studs. This the third threaded stud is received in an opening of a coplanar base for the portable cooker. The base comprises a circular rim having a diameter which approximates the diameter of the disk and a plurality of spokes extending between the centrally disposed portion of the base which defines the third threaded opening and a rim. The rim and spokes have elongated generally rectangular cross-sections which serve the purpose of providing a firm grip when the portable cooker is supported on sand, grass or other material that it may sink into to some extent. Each spoke has a spiral part where it is connected to the rim which simplifies manufacture and also aids in providing stability for the base so that it is unlikely to rotate. In this connection, the spiral parts have the same cross-section as the rim and the spokes and therefore also tend to sink into the material such as sand and grass on which the portable cooker may be placed thus further anchoring it in a fixed position. When the four parts of the cooker, the disk, the burner unit, the tubular post, and the base are assembled, it has an overall height of about thirty-two inches. If the tubular post is removed and the threaded steel stud connected to the bracket of the burner unit is directly received in the threaded opening of the rim, then the overall height of the unit is reduced to about twelve inches whereby it may be placed on a table or stationwagon's tailgate or the like. By means of the bracket, the burner unit is spaced several inches above the base to inhibit effective heat transfer from taking place between the burning unit and the base. Two further parts are required for an operating portable cooker. These are the propane bottle and a rubber hose for connecting the propane bottle to an aspirator and fuel supply tube which are part of the burner unit.

A further important object of the invention lies in its adaptability for a number of different uses. Thus, as indicated, the portable cooker can be supported on the burner unit so that the disk is at a height of about thirty two inches when the tubular post is used and, without such post, the disk can be supported at a height of about twelve inches. Also as discussed above, the disk can be removed and the flat area defined by the coplanar tops of the flanges of the burner unit can be used to support coffee pots, a variety of other pots and pans which have flat bottoms as well as skillets. In each case, an effective hot flame is received from the burner unit on the bottom of the utensil which flows readily outwardly from the center thereof.

For transport, the stud depending from the disk is threadably received by the opening in the base and the burner unit and tubular posts are placed in the cooking disk. The propane bottle is best carried separately and the hose which interconnects the propane bottle with the fuel supply of the burner unit can also be carried in the disk or together with the propane bottle, as desired. The tubular post and burner unit can be easily secured in place in the disk by a rope or resilient member which may be an endless member.

The disk and the coplanar base may also be used together for heating of the disk with charcoal briquettes. The briquettes are placed in the spaces defined between the spokes and the rim of the base and on the bare ground. When they are burning in such disposition they give off sufficient radiant heat for cooking purposes. Then by means of the stud depending from the cooking disk, the cooking disk is secured to the base over the burning briquettes whereby various types of food can then be prepared in the disks. In the meanwhile the rim and spokes safely secure the briquettes in place under the disk.

The foregoing and other objects, adaptabilities and capabilities of the invention will appear as the description progresses, reference being had to the accompanying drawings in which:

DETAILED DESCRIPTION OF THE PREFERRED EMBODIMENTS OF THE INVENTION

Figure 1:
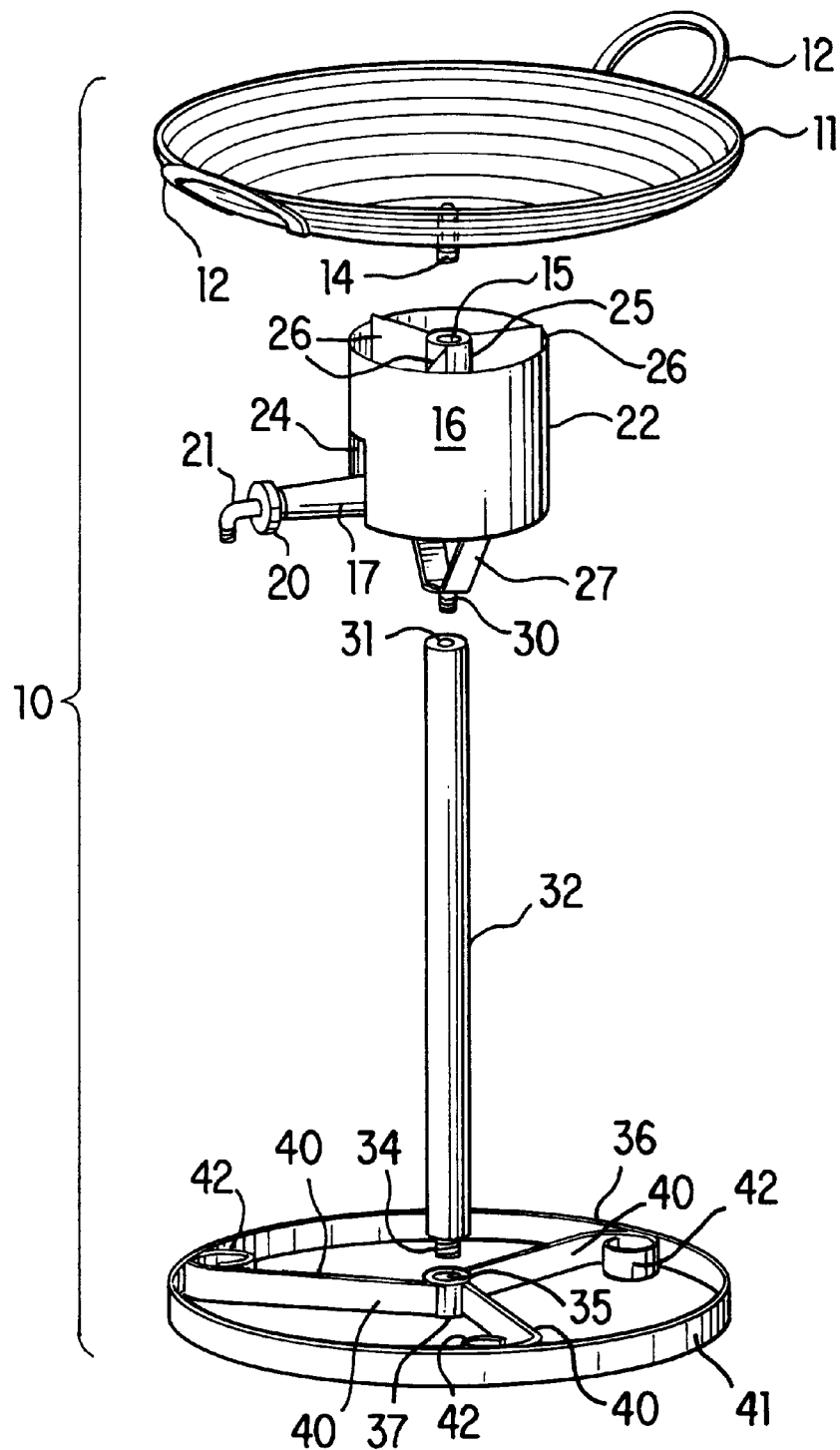
FIG. 1 is a perspective view of the portable cooker in accordance with the invention with the four major parts shown separated and in alignment for the purposes of clarity.

Referring now to the Figures, the portable cooker which is generally designated by reference number 10 comprises a cooking disk 11 to which horseshoe shaped handles 12 are secured, so as to be connected rigidly thereto, such as by welding. Depending rigidly from the center of cooking disk 12 is a first threaded bolt or stud 14 which is threadably receivable in a first threaded opening 15. The burner unit 16 contains a conventional burner (not shown) such as disclosed, for example, in U.S. Pat. No. 4,062,341 to Panzarella of Dec. 13, 1977. The burner is connected to a fuel supply pipe 17 which terminates in an aspirator 20 and an elbow connection 21 which is threaded to receive a conventional flexible tube having a threaded connector at its upper end that engages elbow connector 21 and which also has a threaded connection at its lower end which engages a pressurized fuel tank or propane bottle. The propane bottle and flexible tube are of conventional design, examples of which are disclosed in U.S. Pat. No. 5,158,067 to Dutro et al of Oct. 27, 1992. This latter patent also discloses a conventional gas burner fitting design, all of which are well known by those skilled in the art and, including the means of securing a propane bottle to the unit, are incorporated by reference herein. Burner unit 16 also comprises a cylindrically configured shield 22 which is provided with a slot 24 for receiving fuel supply pipe 17 and admitting air into burner unit 16. Welded or otherwise rigidly secured to a central body comprising a shaft 25 which defines opening 15 in its upper aspect, are a plurality of flanges 26 which are also welded or otherwise firmly secured to shield 22. Flanges 36 are vertically disposed and extend radially relative to centerline of shield 22 which is also the centerline of opening 15. Flanges 26 extend upwardly a small distance from shield 22 which, in the embodiment disclosed, is in the range 0.1 to 0.5 inches and preferably about 0.2 inches. The tops of flanges 26 and the top of shaft 25 are flat, coplanar and horizontal so that they form an area which receives and is capable of supporting cooking utensils such as a coffee pot or skillet. Although in the embodiment shown in the Figures, there are three flanges 26, more than three flanges can be employed such as, for example, four flanges or six flanges all of which extend radially from shaft 25 at the centerline of shield 22 and opening 15. From the lower aspect of burner unit 16 is affixed a bracket 27 to which is rigidly secured a second threaded bolt or stud 30 that has the same centerline, gage and threading as bolt 14 of disk 11. Stud 30 is threadably receivable in a second threaded opening 31 which is in the top of tubular post 32. At its lower end, tubular post 32 has a third threaded stud or bolt 34 rigidly secured thereto. Stud 34 has the same threading and gage as studs 14 and 30, and is threadably receivable in a third threaded opening 35 which is provided in a support footing or coplanar base 36. Base 36 comprises a short shaft member 37 which contains opening 35 and from which a plurality of spokes 40, three in the embodiment shown, extend generally radially from the shaft member 37 to a rim 41. Spokes 40 are welded otherwise rigidly secured on their inner ends to shaft member 37 and on their outer ends to rim 41. It will be noted that each spoke 40 includes a spiral part 42 which simplifies the manufacture of base 36 and also provides improved contact between base 36 and the underlying ground, particularly if the underlying ground is covered with grass, or is sand or gravel or dirt. Spokes 40 and rim 41 are composed of a steel strip material which has an elongated vertical cross-section. Base 36 has a coplanar bottom, and rim 41 and spokes 40 may be bevelled on their bottoms or have curved surfaces as seen in cross-section.

With stud 14 firmly received in opening 15, stud 30 firmly received in opening 31 and stud 34 firmly received in opening 35 the overall height of the portable cooker 10 is approximately thirty-two inches. In use, the flame which is provided from burner unit 16, assuming that a propane bottle via a flexible tubular connected thereto, is quite hot. The gases of combustion are guided by flanges 26 whereby cooking disk 11 is adequately heated so that it can be employed as a cooking utensil similar to a wok for the preparation of food. For example, a cooker 10 can be used for preparation of fajitas, stir fry, chili, a jambalaya or even a breakfast of fried eggs with bacon, ham or sausage, as well as for numerous other recipes.

Figure 2:
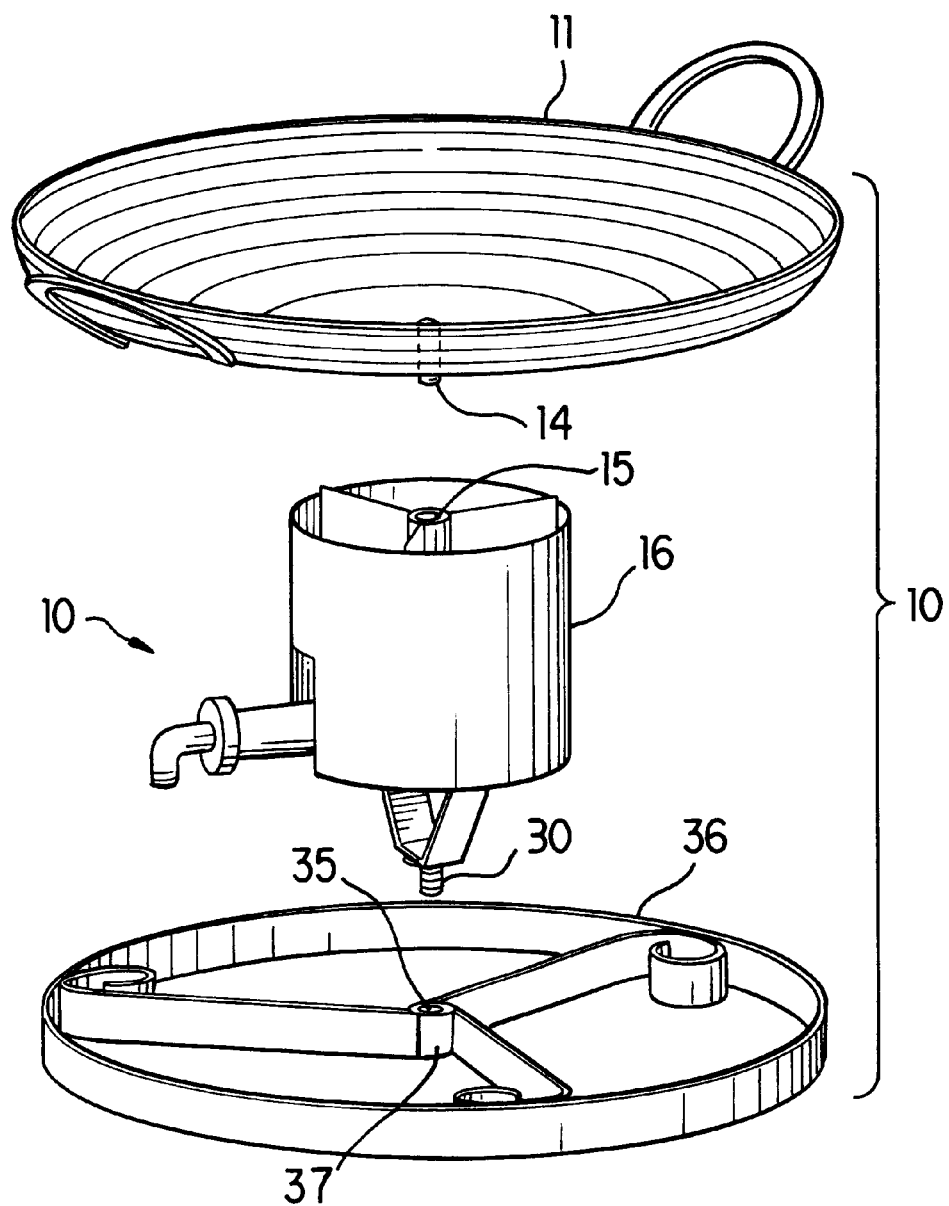
FIG. 2 is a perspective view similar to FIG. 1 showing the unit when the tubular post is removed.
Figure 3:
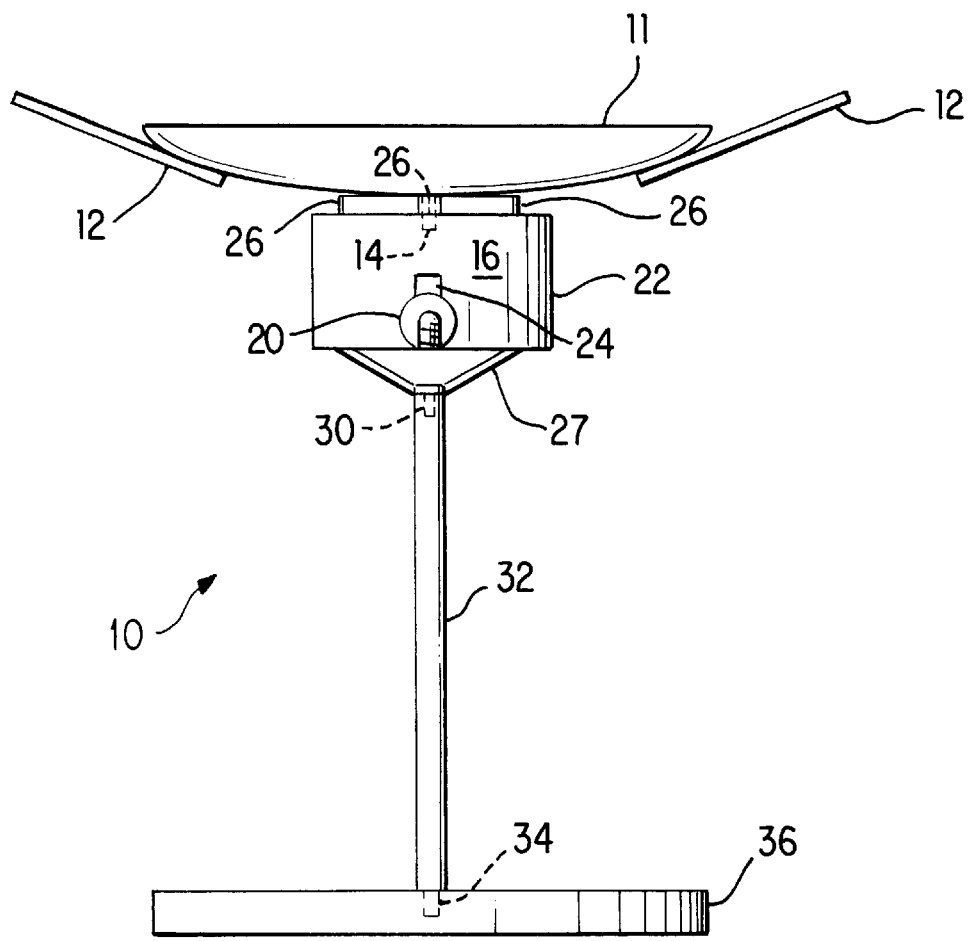
FIG. 3 is a front elevational view of the invention showing the parts connected.

FIG. 2 shows how the portable cooker 10 may be assembled to provide an overall height of approximately twelve inches whereby it is suitable for support and use on the tailgate of stationwagon or on a picnic table. This is accomplished by removing the tubular post 32 and connecting the burner unit 16 directly to base 36 by means of the second threaded stud 30 being firmly received in the third threaded opening 35 of shaft member 37 of base 36.

Figure 4:
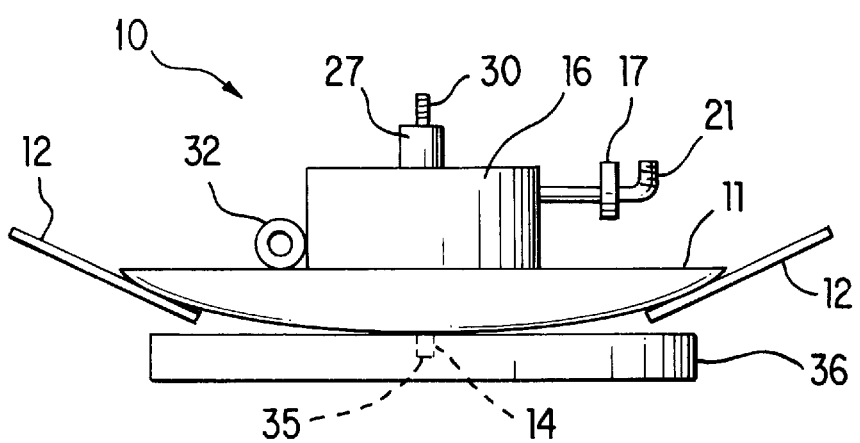
FIG. 4 is a side elevational view showing the invention when it is disassembled for transport purposes.

FIG. 4 illustrates how the cooker 10 may be arranged in a compact manner to facilitate a transport. Here, disk 11 is firmly secured directly to base 36 by the first threaded stud 14 being threadably received in the third threaded opening 35. Burner unit 16 is then simply placed upside down in disk 11 and post 32 is laid across disk 11 so that it touches burner unit 16. As previously indicated, if desired, components 16 and 32 can be urged against disk 11 and secured in place by rope or an elastic member which is secured to and extends between handles 12.

Figure 5:
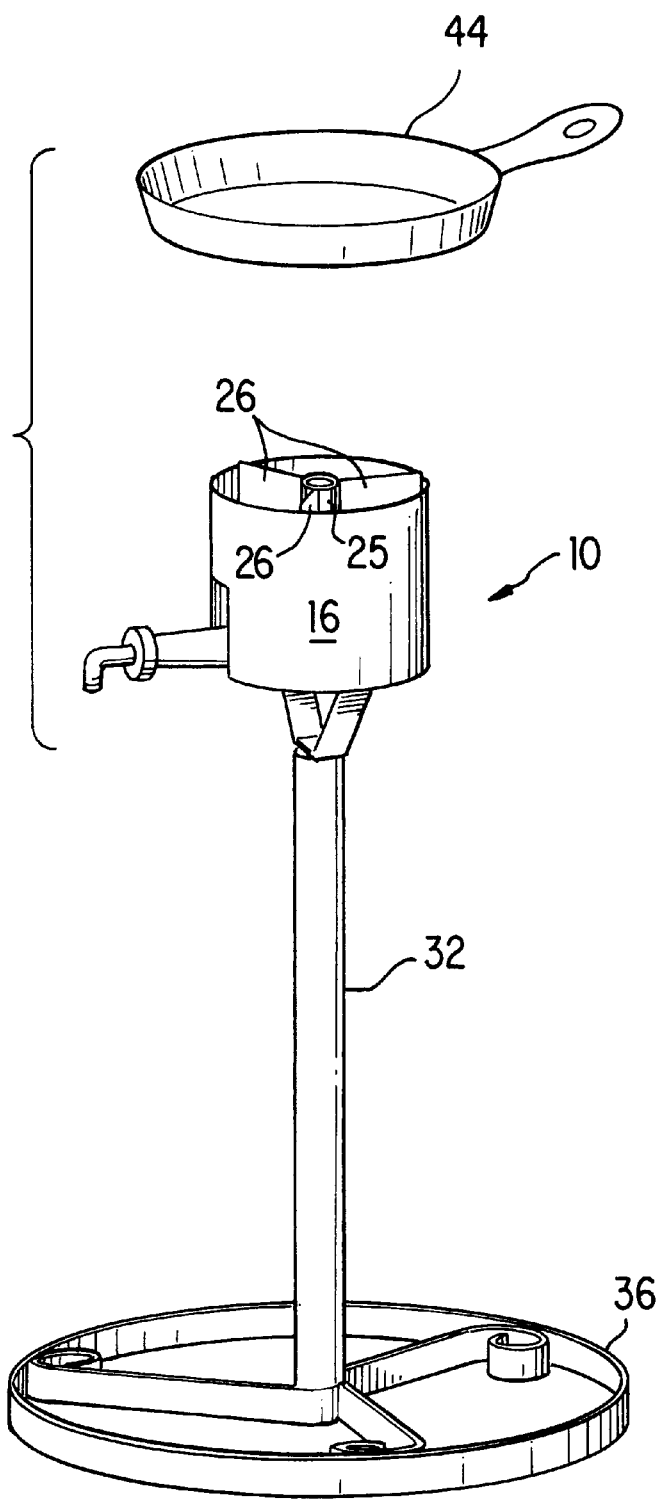
FIG. 5 is perspective view of the invention wherein the cooking disk has been removed so that the burner unit may receive a cooking utensil such as a skillet.
Figure 6:
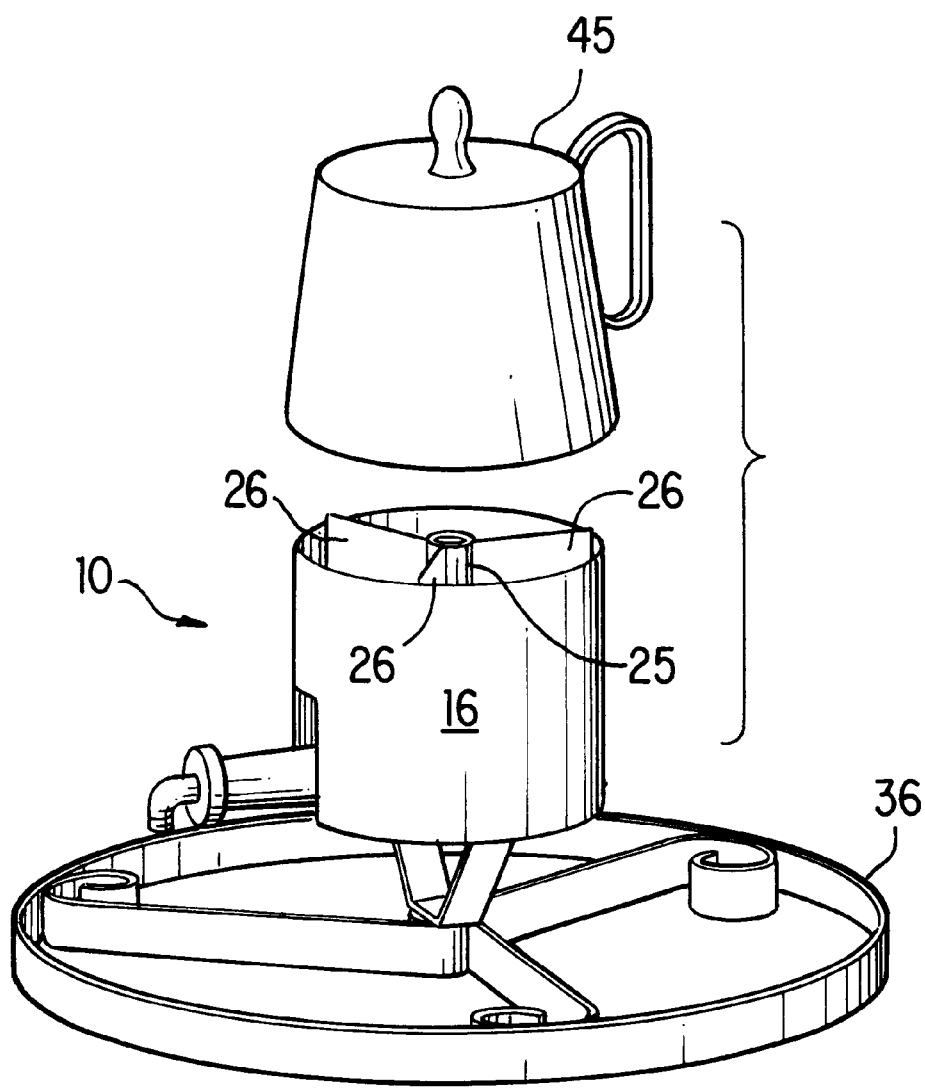
FIG. 6 is a perspective view similar to FIG. 5 wherein the tubular post has been removed and a cooking unit is disposed to receive a cooking utensil such as a coffee pot.

FIGS. 5 and 6 illustrate use of the cooker 10 with disk 11 removed so that it is adaptable to receive a skillet 44 as shown in FIG. 5 or a coffee pot 45 as shown in FIG. 6. It will thus be appreciated that skillet 44 or coffee pot 45 is directly receivable on the flat surface defined by the tops of flanges 26 and shaft 25 of burner unit 16. FIGS. 5 and 6 also disclose a portable cooker 10 with burner unit 16, tubular post 32 and base 36 assembled (FIG. 5) and with burner unit 16 secured directly to base 36 (FIG. 6).

The adaptability of the invention for a variety of uses may be illustrated by two examples which, although not common, nevertheless are feasible and practicable. Thus, referring to FIG. 4, considering that burner unit 16 and tubular post 32 are removed, the height of the base 36 above the ground (1.1 to 1.5 inches) is sufficient so that a layer of charcoal briquettes may be arranged between rim 41 and spokes 40 while still providing that there is some space between the upper side of the briquettes and the disk 11 secured to base 36. By filling such spaces with charcoal briquettes which are laid flat in one layer, substantial radiant heat is provided by the combustion of the charcoal briquettes whereby disk 11 may be used in its usual manner for cooking various dishes. Accordingly, when a group may be hiking for a greater distance than convenient to carry the cooker 10 together with a propane bottle, simply disk 11 and base 16 may be placed in a knapsack together with a plastic bag containing briquettes for cooking food at a destination which may be substantially removed from places that can be reached by automobile. Of course, instead of charcoal briquettes, firewood, particularly in the form of chips or small branches can be used with this combination. By confining the fire to the area, within base 36, the possibility of the fire spreading is diminished to a substantial extent.

Often cooker 10 is kept at a vacation home. Normally cooker 10 should not be left outdoors and thus is stored in closet or another out-of-the-way place. However, cooker 10 is of approximately the right size and shape so that it can be used, with or without burner unit 16 as a table to be placed beside chairs, sofas or beds to serve the purpose of an end table. Even a lamp, properly centered, can be supported by disk 11. In this mode, cooker 10 is performing a useful function quite distinctive from its primary function and, at the same time, reducing the need for another end table and reducing the space required for storing components which should be stored when not in use such as the propane bottle.

Figure 7:
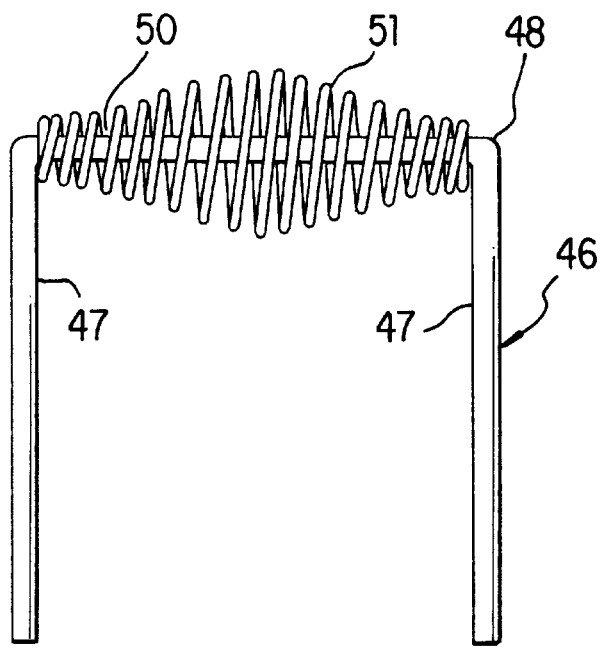
FIG. 7 is a detailed view of a handle which can be used on each side of the cooking disk in substitution for the handles shown in FIGS. 1 through 4.
Figure 8:
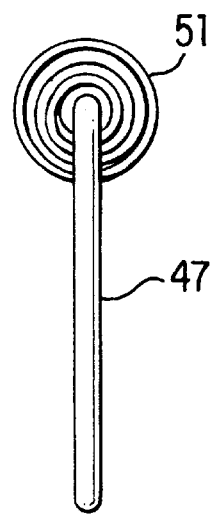
FIG. 8 is a side elevational view of the substitute handle shown in FIG. 7.

FIGS. 7 and 8 disclose a handle 46 which can be secured to disk 11 in lieu of handles 12. In other words, handles 12 can each be replaced in another embodiment by handles 46 which are welded or otherwise firmly secured to disk 11. Handles 12 each comprises a 0.25 inch diameter carbon steel or stainless steel "U" shaped supporting frame 48 which forms three sides of a rectangle, the two legs 47 of frame 48 being about four inches in length and a connecting part 50 therefrom being about three and one-half inches long and surrounded by 0.105 inch diameter wire in the configuration shown which may be slightly in compression so that it is secured relatively firmly between legs 47 and surrounds part 50. The primary purpose of this design is to increase exposure of handle 46 and particularly the wire portion 51 to ambient air temperatures whereby metal-to-metal thermal conduction from disk 11 through handle 46 and particularly to wire portion 51 is adequately counteracted by the ambient air temperature so that, if necessary, cooker 10 can be lifted, in use, by handles 46 or held steady by one of them without handles 46 being uncomfortable for the operator to touch or use or requiring the use of gloves. In this connection, it should be understood that the cooker in accordance with the invention has the capacity to provide up to one hundred, thirty thousand BTU's which is more than provided by any comparable burner of a conventional stove.

In manufacturing a cooker 10, disk 11 is custom spun from carbon steel. Studs 14, 30 and 35, as well as threaded openings 15, 31 and 35 are custom-made to ensure that the cooker, when assembled, is substantially rigid but can, at the same time, be disassembled manually without undue difficulty.

Although I disclosed preferred embodiments of my invention, it is to be understood that it is capable of other adaptations and modifications within the scope of the appended claims.

Having thus described my invention, what I claim as new and to be secured by Letters Patent in the United States is:

1. A portable fuel heated cooker which comprises a cooking disk; a pair of handles rigidly connected to and extending outwardly from said cooking disk; a first threaded stud rigidly and centrally connected to the bottom of said cooking disk and extending normally therefrom; a burner unit for supporting and heating said disk, said burner having upper and lower sides, a first threaded opening on upper side of said burner unit which is adapted to receive said first threaded stud; a second threaded stud rigidly connected to the bottom side of said burner unit; a tubular post having an upper end and a lower end, a second threaded opening in said upper end of said tubular post which is adapted threadably to receive said second threaded stud; a third threaded stud rigidly connected to the bottom end of said tubular post which has the same threading as said second threaded stud; a coplanar base having a coplanar bottom, a third threaded opening which is centrally disposed in the top of said coplanar base and which is adapted threadably to receive said third threaded stud; said tubular post being threadably removable from the cooker and said second threaded stud being threadably received by said third threaded opening to provide a direct connection between said burner unit and said coplanar base for thereby selectively reducing the height of the cooker.

2. A portable gaseous fuel heated cooker in accordance with claim 1 wherein said first threaded stud has the same threading as said second threaded stud and said third threaded stud whereby said first threaded stud can be selectively threadably received in said second opening or in said third opening.

3. A portable gaseous fuel heated cooker in accordance with claim 1 wherein said coplanar base comprises spokes and a rim, said spokes extending outwardly from said third threaded opening to said rim, said spokes and said rim having an elongated vertically disposed generally rectangular cross-section.

4. A portable gaseous fuel heated cooker in accordance with claim 1 wherein said burner unit comprises a surrounding shield, a gaseous fuel burner; a control body defining said first threaded opening; and a plurality of generally vertically disposed internal flanges rigidly interconnecting said body to said shield, said internal flanges extending outwardly from within said shield to a height higher than said shield, being radially disposed from said body to said shield as seen from above and the tops of said flanges being horizontally coplanar and not lower than said body whereupon said flanges are capable of supporting a flat bottom cooking utensil above said burner so that it can be heated by said burner.

5. A portable gaseous fuel heated cooker in accordance with claim 4 wherein said shield is cylindrical in form and said flanges extend a distance in the range of 0.1 to 0.5 inches above said shield.

6. A portable gaseous fuel heated cooker in accordance with claim 5 wherein said flanges extend about 0.2 inches above said shield.

7. A portable gaseous fuel heated cooker in accordance with claim 4 comprising three of said flanges which are separated relative to the longitudinal axis of said body by about one hundred and twenty degrees.

8. A portable fuel heated cooker which comprises a cooking disk having a rounded bottom and a stud rigidly and centrally connected to the bottom of said cooking disk and extending normally therefrom, a burner unit for heating said cooking disk, said burner unit comprising a cylindrical shield which contains a burner for burning a gaseous fuel, a central body and a plurality of flanges connecting said central body to said shield, said flanges extending upwardly outwardly from said shield and defining on their upper edges a coplanar horizontal surface, said body disposed centrally in said shield and having an opening which has a longitudinal axis which coincides with the longitudinal axis of said shield, said opening adapted to receive said stud to retain said disk firmly and removably above said burner unit, said horizontal coplanar surface of said flanges adapted to receive flat bottom cooking utensils when said stud including the disk connected thereto are removed from their positions on and above said burner unit.

9. A portable fuel heated cooker in accordance with claim 8 wherein said stud and said opening are correspondingly threaded so that said stud is threadably receivable in said opening.

10. A portable fuel heated cooker in accordance with claim 8 wherein the top of said body is coplanar and coincides with a horizontal plane which coincides with the coplanar top edges of said flanges.

11. A portable fuel heated cooker in accordance with claim 8 wherein there are three of said flanges which are separated from each other by about 120°.

12. The portable fuel heated cooker in accordance with claim 8 wherein the distance that said flanges extend above said shield is in the range of 0.1 to 0.5 inches.

13. A portable fuel heated cooker in accordance with claim 8 wherein the distance that said flanges extend above said shield is about 0.2 inches.

14. A portable fuel heated cooker in accordance with claim 8 further comprising a further stud rigidly connected to said bottom of said burner unit, a tubular post having an upper end and a lower end, a further threaded opening in said upper end of said tubular post which is adapted firmly and removably to receive said further stud, another stud rigidly connected to said bottom end of said tubular post, a base having another opening for firmly and removably receiving said another stud.

15. A portable fuel heated cooker in accordance with claim 14 wherein said first mentioned stud, said further stud, and said another stud, have each a longitudinal axis which coincide with each other and with a further longitudinal axis of said burner unit.

16. A portable fuel heated cooker in accordance with claim 15 wherein said base comprises spokes and a rim, said spokes extending outwardly from said another opening to said rim, said rim and said spokes having top edges which are coplanar with each other and bottom edges which are coplanar with each other, said rim and said spokes having elongated generally rectangular cross-sections and the same heights which for said rim and each said spokes is a height in a range of 1.1 to 1.5 inches.

17. A portable fuel heated cooker in accordance with claim 16 wherein said height is about 1.3 inches.

18. A portable fuel heated cooker in accordance with claim 8 which further comprises a pair of handles rigidly connected and extending outwardly from said cooking disk, each of said handles comprising a pair of parallel legs connected with an outward part, a spiral wire wound about said outward part so as to be spaced therefrom whereby heat conducted from said disk to said wire is reduced due to limited contact between said wire and said outer part and by the cooling effect of the ambient air atmosphere.

19. A portable fuel heated cooker which comprises a cooking disk; handle means connected to said disk extending outwardly therefrom, first connection means rigidly connected to the bottom of said cooking disk; a burner unit for supporting and heating said cooking disk, said burner unit having upper and lower sides, a second connection means on the upper side of said burner unit that is firmly and removably connected to said first connection means; a third connection means on the bottom side of said burner unit; a tubular post having an upper end and a lower end, a fourth connection means on the upper end of said tubular part which is firmly and removably connected to said third connection means; a fifth connection means connected to the bottom end of said tubular part; a coplanar base having a coplanar top and a coplanar bottom, a sixth connection means centrally disposed on the top of said coplanar base which firmly and removably receives said fifth connection means; whereby said cooking disk, said burner unit, said tubular post, and said coplanar base can be selectively connected to each other and disconnected from each other so that they can selectively be assembled in any desired order or combination.

\* \* \* \* \*